(12) United States Patent  (10) Patent No.: US 9,318,954 B2
Le-Hung et al.  (45) Date of Patent: Apr. 19, 2016

(54) CONTROL WITH HYSTERESIS OF AN ELECTRONIC DEVICE USING A PULSE-WIDTH MODULATED SIGNAL

(75) Inventors: Frédéric Le-Hung, Tournefeuille (FR); Stéphane Saint-Macary, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 344 days.

(21) Appl. No.: 13/981,780

(22) PCT Filed: Feb. 3, 2012

(86) PCT No.: PCT/EP2012/000494
§ 371 (c)(1),
(2), (4) Date: Sep. 3, 2013

(87) PCT Pub. No.: WO2012/107190
PCT Pub. Date: Aug. 16, 2012

(65) Prior Publication Data
US 2013/0335051 A1  Dec. 19, 2013

(30) Foreign Application Priority Data
Feb. 9, 2011 (FR) ..................... 11 00397

(51) Int. Cl.
*G05F 1/46* (2006.01)
*H02M 3/156* (2006.01)
(52) U.S. Cl.
CPC ............ *H02M 3/156* (2013.01); *H02M 3/1563* (2013.01)

(58) Field of Classification Search
CPC ............ G05F 1/46; G05F 1/461; G05F 1/463
USPC ......................................... 323/282–290, 351
See application file for complete search history.

(56) References Cited

U.S. PATENT DOCUMENTS 5,767,653 A * 6/1998 DeFiore et al. ............... 318/811
6,188,206 B1 2/2001 Nguyen et al.
(Continued)

FOREIGN PATENT DOCUMENTS

CN 101499717 8/2009
EP 1 087 506 A2 3/2001
(Continued)

OTHER PUBLICATIONS

International Search Report, dated Apr. 17, 2012, from corresponding PCT application.

*Primary Examiner* — Adolf Berhane
*Assistant Examiner* — Nusrat Quddus
(74) *Attorney, Agent, or Firm* — Young & Thompson

(57) ABSTRACT

A device and switching method for a circuit for generating an output voltage (Vout) via a control signal (CTRL) with two pulse-width modulated states are described. The control signal (CTRL) frequency (Fq) is measured. In order to generate the control signal (CTRL), either a first hysteresis comparator (31) or a second hysteresis comparator (32) is enabled depending on the control signal (CTRL) measured frequency (Fq). Advantageously, the voltage thresholds of the hysteresis comparators and at least one frequency threshold can be chosen in such a manner as to avoid the control signal (CTRL) frequency (Fq) entering into forbidden frequency bands.

20 Claims, 3 Drawing Sheets

(56) References Cited

U.S. PATENT DOCUMENTS

| | | |
|---|---|---|
| 7,486,288 B2 * | 2/2009 | Kojima .......................... 345/211 |
| 8,169,205 B2 * | 5/2012 | Chen et al. .................... 323/282 |
| 8,436,599 B2 * | 5/2013 | Cacciotto ...................... 323/283 |
| 2004/0164720 A1 | 8/2004 | Ravon |
| 2008/0278225 A1 | 11/2008 | Hu et al. |
| 2010/0026263 A1 * | 2/2010 | Moussaoui et al. ........... 323/283 |
| 2010/0134085 A1 | 6/2010 | Nishida |
| 2010/0301827 A1 * | 12/2010 | Chen et al. .................... 323/299 |
| 2012/0300499 A1 * | 11/2012 | Chang et al. .................... 363/16 |

FOREIGN PATENT DOCUMENTS

| | | |
|---|---|---|
| GB | 2426836 A | 6/2006 |
| TW | 591866 | 6/2004 |
| WO | 00/59106 A1 | 10/2000 |

\* cited by examiner

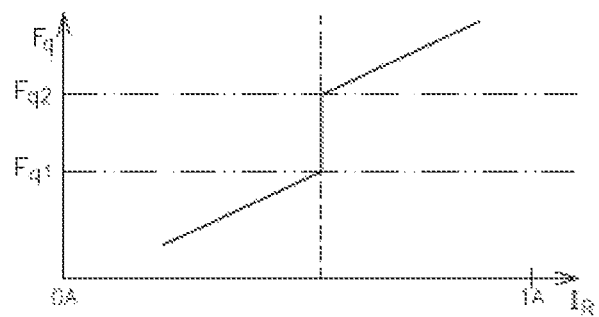
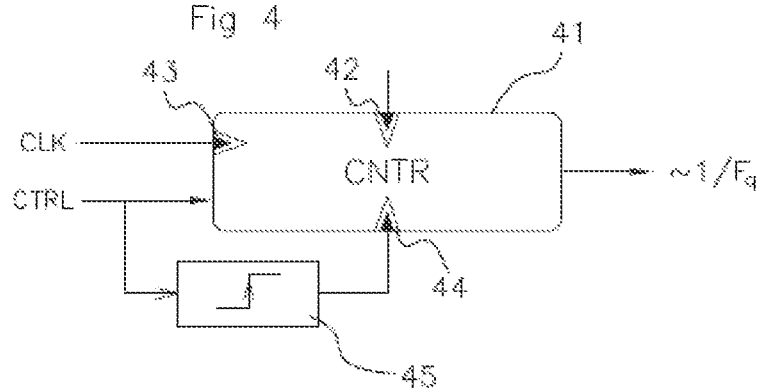
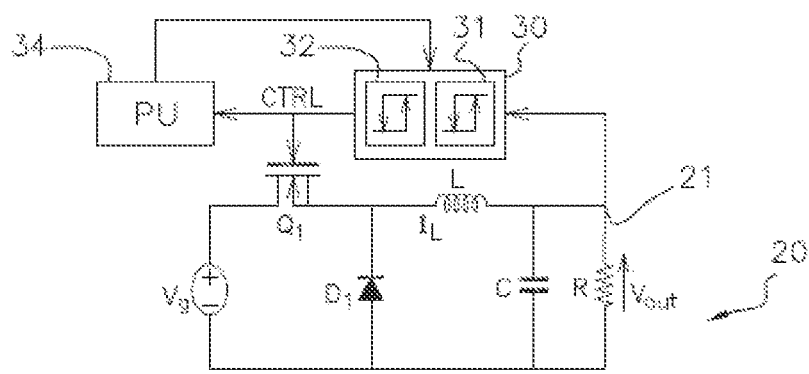

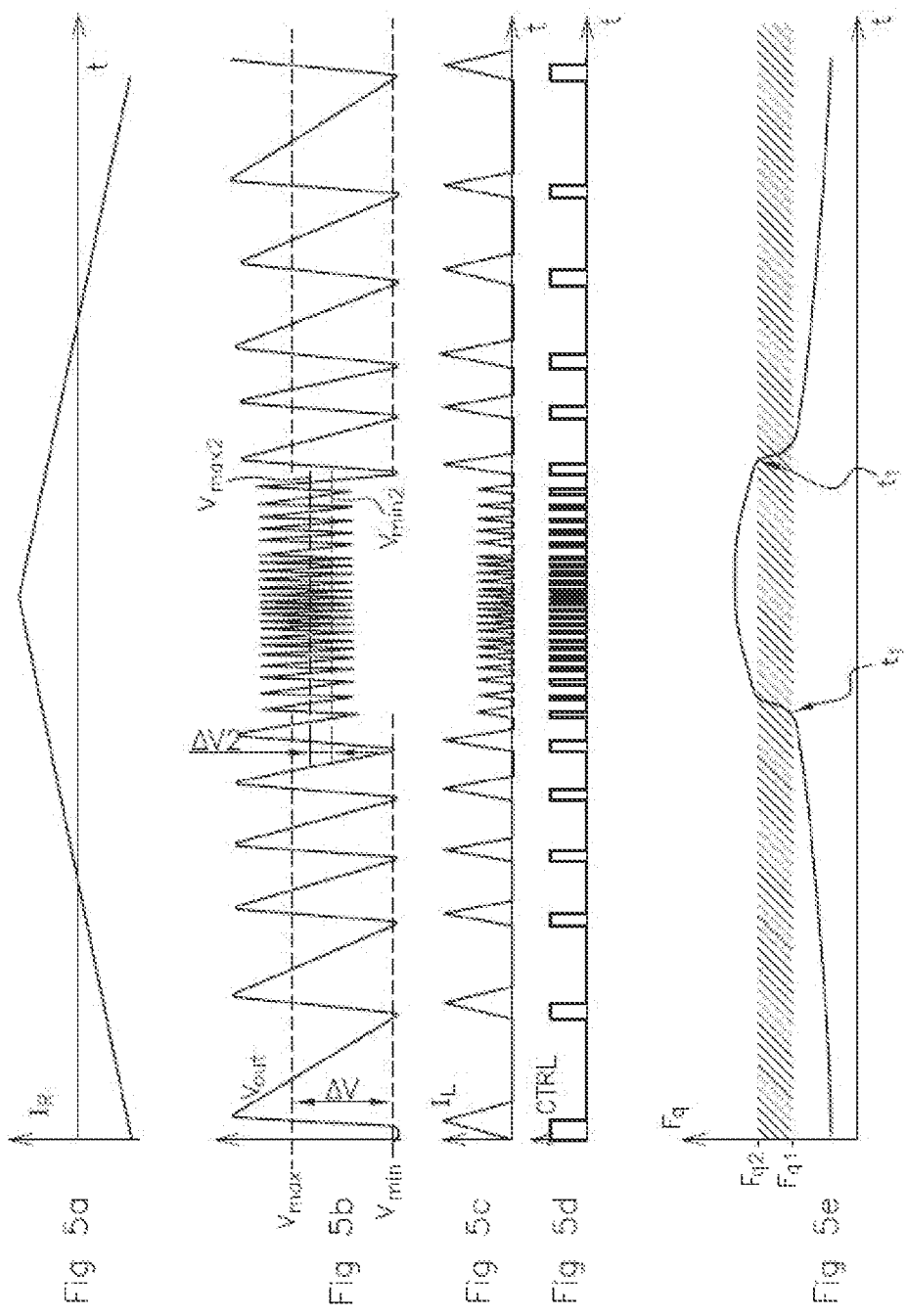

CONTROL WITH HYSTERESIS OF AN ELECTRONIC DEVICE USING A PULSE-WIDTH MODULATED SIGNAL

BACKGROUND OF THE INVENTION

1. Field of the Invention

The present invention generally relates to switched electronic devices with hysteresis control, and more particularly, to switched-mode power supplies (or SMPS) of this type.

The invention is applicable, in particular, to switched-mode power supplies for supplying power to automobile vehicle electronic control units.

2. Description of the Related Art

Hysteresis switched-mode power supplies are switched electronic devices, typically controlled by a Pulse Width Modulation (or PWM) signal with two states, whose changes of state result from the comparison of a controlled value with a low threshold and with a high threshold.

This signal has a control frequency which varies as a function of the operating point (voltage, current). With a substantially constant output voltage, it varies in a continuous manner with the value of the output current. The higher the output current absorbed by the load, the higher the control frequency. For this reason, this control frequency may go into specific bands of frequencies and end up at a non-compliance with the specifications in terms of electromagnetic compatibility (EMC) when the product is qualified. These bands of frequencies are referred to as "forbidden".

Switched-mode power supplies are therefore designed and component values chosen so as to operate up to a maximum "authorized" frequency, which is below the lowest forbidden band of frequencies. This generally allows the requirements in terms of EMC to be guaranteed.

This result is however obtained at the expense of difficult compromises between the requirements relating to the desired ranges of operation (current, voltage), and to the economically acceptable values of the most critical components of the switched-mode power supply, more particularly of the inductor and of the capacitor. This is because limiting the frequency of operation requires the use of components having high values, hence costly and furthermore bulky, in order to obtain certain operating points at high currents and/or voltages.

SUMMARY OF THE INVENTION

The invention aims to improve the situation. It is based on the observation made by the inventors whereby, in the devices controlled in hysteresis mode, the frequency of operation is conditioned by the hysteresis thresholds.

For this purpose, a first aspect of the invention provides an electronic device comprising:

a switched circuit having an output designed to deliver an output voltage, and controlled by a control signal with two pulse-width modulated states;

a first hysteresis comparator, with a first low-voltage threshold and a first high-voltage threshold higher than said first low-voltage threshold, designed, when it is enabled, to generate the control signal depending on the result of the comparison between the output voltage, on the one hand, and the first low-voltage threshold and the first high-voltage threshold, on the other;

at least a second hysteresis comparator, with a second low-voltage threshold and a second high-voltage threshold higher than said second low-voltage threshold, designed, when it is enabled, to generate the control signal depending on the result of the comparison between the output voltage, on the one hand, and the second low-voltage threshold and the second high-voltage threshold, on the other; and, a control unit designed to measure the frequency of the control signal, and to enable either the first hysteresis comparator or the second hysteresis comparator depending on the control signal measured frequency, the first hysteresis comparator being enabled for relatively low frequencies of the control signal, and the second hysteresis comparator being enabled for relatively high frequencies of the control signal.

Advantageously, the difference between the second high-voltage threshold and the second low-voltage threshold is less than the difference between the first high-voltage threshold and the first low-voltage threshold.

In this way, when the control unit causes the second comparator to be enabled in place of the first comparator, the control signal switching frequency increases sharply. Conversely, when the control unit causes the first comparator to be enabled in place of the second comparator, the control signal switching frequency drops abruptly. In other words, the switching from one comparator to the other causes jumps in the control signal frequency which allow some bands of frequencies to be avoided.

This new architecture for switch-mode devices operating in hysteresis mode therefore allows operation over a wide range of frequencies without however passing through regions of forbidden frequencies. Indeed, the switched circuit may be controlled in such a manner that the frequency of operation or switching frequency remains outside of specific frequency bands where the EMC specifications are more stringent. For this purpose, the voltage thresholds of the hysteresis comparators, and at least one frequency threshold used for enabling a hysteresis comparator, can be chosen in such a manner as to avoid the frequency of the control signal entering into forbidden frequency bands.

The design values of the electronic device can now take advantage of this increase in the range of frequencies so as to accept lower values of external components (more particularly L and C), or else to increase the requirements of the specifications thus providing on overall value-added.

The implementation of the invention allows, for example, a switched-mode power supply with hysteresis to operate within specific frequency bands where the EMC constraints are stringent.

This is achieved by the selection of a hysteresis comparator with hysteresis thresholds designed to maintain the switching frequency within permitted bands of frequencies, more particularly avoiding the forbidden frequency bands.

The enabling of one from amongst at least two hysteresis comparators allows the undulation variation excursion of the output voltage to be applied in a discrete (i.e. non-continuous) manner. The pulse-width modulated control signal frequency, which depends on the value of this excursion, itself varies in a discrete manner in going from one band of frequencies to another without going via undesirable frequency bands.

In embodiments, the enabling of the hysteresis comparators is carried out via a digital technology, which allows a flexibility and a simplicity that analog control does not allow.

In a second aspect, the invention also relates to a switched-mode power supply comprising at least one device for chopping an input voltage. The chopping device comprises an electronic device according to the first aspect.

Another aspect of the invention also provides the use of a switched-mode power supply, according to the second aspect, with a device for chopping the input voltage having the structure of a DC-DC voltage converter of the step-down voltage converter type, for supplying power to an automobile vehicle electronic control unit.

Finally, a last aspect of the invention provides a switching method for a circuit designed to generate an output voltage starting from a control signal with two pulse-width modulated states. The method comprises:

the measurement of the frequency of the control signal; and, the enabling of a first hysteresis comparator or of a second hysteresis comparator depending on the control signal measured frequency, in order to generate the control signal.

In this method, the first hysteresis comparator having a first low-voltage threshold and a first high-voltage threshold higher than said first low-voltage threshold, and being designed to generate the control signal depending on the result of the comparison between the output voltage, on the one hand, and the first low-voltage threshold and the first high-voltage threshold, on the other, is enabled for relatively low frequencies of the control signal.

Furthermore, the second hysteresis comparator having a second low-voltage threshold and a second high-voltage threshold higher than said second low-voltage threshold, and being designed to generate the control signal depending on the result of the comparison between the output voltage, on the one hand, and the second low-voltage threshold and the second high-voltage threshold, on the other, is enabled for relatively high frequencies of the control signal.

Lastly, the difference between the second high-voltage threshold and the second low-voltage threshold is lower than the difference between the first high-voltage threshold and the first low-voltage threshold.

BRIEF DESCRIPTION OF THE DRAWING FIGURES

Other features and advantages of the invention will furthermore become apparent upon reading the description that follows. The latter is purely illustrative and must be read with regard to the appended drawings in which:

FIG. 3 is a diagram of a switched device controlled by a pulse-width modulated signal with hysteresis, according to embodiments of the invention;

FIG. 4 shows one exemplary embodiment of a control unit for the device in FIG. 3;

FIGS. 5a to 5e are timing diagrams of signals illustrating the operation of the device in FIG. 3; and, FIG. 6 is a graph of the switching frequency of the device in FIG. 3 as a function of the current in its load.

DETAILED DESCRIPTION OF THE INVENTION

Figure 1:
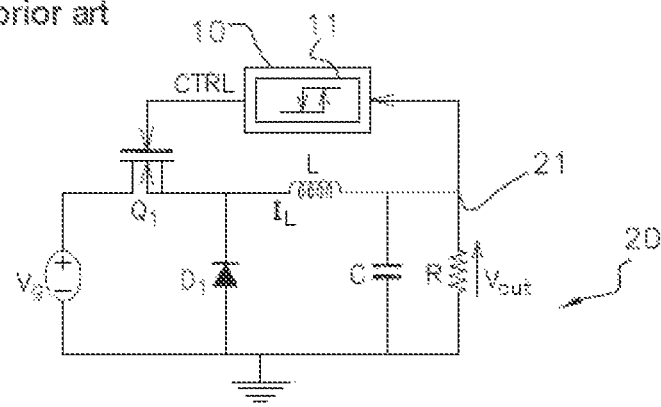
FIG. 1 is a diagram of a switched device controlled by a pulse-width modulated signal with hysteresis, of the known type.

FIG. 1 shows one example of a device switched by a pulse-width modulated control signal. It has the structure of a DC-DC converter of the step-down voltage type ("Buck" converter structure).

In this structure, a chopping element, in general a power transistor Q1 such as a MOSFET ("Metal Oxide Semiconductor Field Effect Transistor") or an IGBT ("Insulated Gate Bipolar Transistor"), switches from an ON state to an OFF state, or vice versa, depending on the changes in logic state of the control signal CTRL applied to its control gate.

In the case where Q1 is an NMOS transistor, its drain is for example coupled to the positive terminal of a source of DC voltage $V_g$ whose negative terminal can be connected to ground. The source of Q1 is coupled to a first terminal of a load, symbolized here by a resistance R through an inductance L. The second terminal of the load R is coupled to ground. A capacitor C is coupled in parallel with the load R. Finally, a free-wheel diode $D_1$ is coupled to the source of Q1 via its cathode, and to ground via its anode. The diode $D_1$ allows the energy accumulated in the inductance to be evacuated when Q1 goes from the ON state to the OFF state.

The duty cycle of the control signal CTRL determines the times during which Q1 is alternately in the ON state and in the OFF state and hence, on average, the level of a voltage V across the terminals of the load R, substantially smoothed thanks to the capacitor C. With such a step-down voltage converter structure, the level of the voltage Vout is reduced with respect to that of the voltage $V_g$.

The current absorbed by the load R can vary over time according to the operation of the equipment or devices included in the load. This variation of the load current is equivalent to a disruption on the voltage Vout which decreases faster when the load current increases and vice versa.

In order to overcome this disruption of the quantity to be controlled, the device may be used in combination with a hysteresis control. The control signal CTRL is then generated by a control unit 10, which comprises a hysteresis comparator 11 having a low threshold Vmin and a high threshold Vmax.

The hysteresis control technique consists in generating the control signal CTRL directly from the quantity to be controlled, here the voltage Vout across the terminals of the load, by decisions of the all or nothing type. When Vout<Vmin, the signal CTRL goes from the OFF state to the ON state. Conversely, when Vout>Vmax, the signal CTRL goes from the ON state to the OFF state. The device then operates in closed-loop mode, the duty cycle and the frequency of the signal CTRL varying naturally as a function of the disruptions affecting the quantity to be controlled.

This operation is illustrated by the curves in FIG. 2.

Figure 2A:
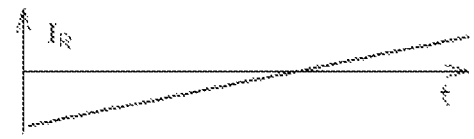
FIGS. 2a to 2e are timing diagrams of signals illustrating the operation of the device in FIG. 1.

In FIG. 2a, an example of variation of the load current $I_R$ as a function of time is shown. It is recalled that $I_R$ varies according to the current demands in the load R. For example, when the load is an automobile vehicle electronic control unit, the current demand depends on the number of calculations performed. The peaks in activity of the electronic control unit create high current demands which correspond to disruptions of the voltage Vout. In the example shown, the current $I_R$ increases in a regular way over time.

Figure 2B:
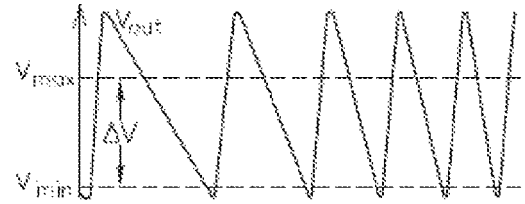

FIG. 2b shows the corresponding variation of the voltage Vout across the terminals of the load, taking into account the hysteresis control. This voltage Vout is the controlled quantity. The horizontal dashed lines represent the constant threshold voltages Vmin and Vmax of the hysteresis comparator of the control unit 10. The voltage Vout exhibits a ripple whose frequency is linked to the transistor Q1 switching frequency, in other words also to the frequency of the signal CTRL.

Figure 2C:
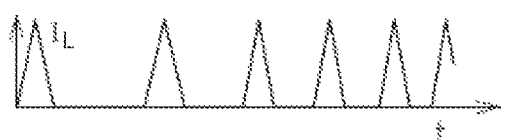

FIG. 2c shows the variation of the current $I_L$ in the inductance L. As can be seen, there exists in this example periods of time where $I_L$ is equal to zero, corresponding to what is known as a discontinuous operation.

Figure 2D:
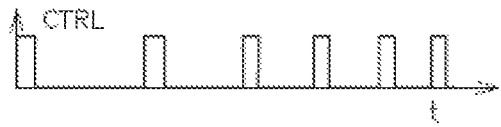

FIG. 2d shows the signal CTRL. As can be seen, it is in the high logic state (such that Q1 is in the ON state) when the voltage Vout is lower than Vmin. In this case, the current $I_L$ is increasing. Conversely, it is in the low logic state (such that Q1 is in the OFF state) when the voltage Vout is higher than Vmax. In this case, the current $I_L$ is decreasing.

Figure 2E:
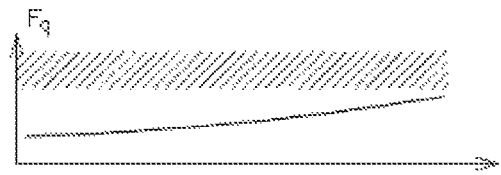

Finally, in FIG. 2e, the variation of the frequency Fq of the control signal CTRL, or device switching frequency, is shown. As can be seen, Fq increases when $I_R$ increases in order to maintain the voltage Vout across the terminals of the load between the threshold voltages Vmin and Vmax of the hysteresis comparator 11 of the control unit 10.

One of the advantages of the hysteresis control technique described hereinabove is a very short response time to the disruptions. The major drawback is the lack of control of the transistors switching frequency, which renders difficult compliance with the EMC standards mentioned in the introduction. The reason for this is that, the higher the output current absorbed by the load, the higher the control frequency. For this reason, the control frequency can go into forbidden frequency bands (hatched area in FIG. 2c), except if components L and/or C of high value are used, but which are expensive.

In order to overcome this drawback, a device of the type illustrated in FIG. 3 is provided, in which the same elements as in FIG. 1 have the same references.

Generally speaking, the invention is applicable to any switched circuit 20 having an output 21 designed to deliver an output voltage Vout, and controlled by a control signal CTRL with two pulse-width modulated states. One typical example corresponds to a switched-mode power supply comprising a device for chopping an input voltage $V_g$. In other words, the output voltage Vout corresponds, in this example, to a supply voltage delivered by the switched-mode power supply. The chopping device comprises the electronic switched device 20 which has already been described with reference to FIG. 1 illustrating the prior art.

As in the case in FIG. 1, embodiments of the invention are described, with reference to FIG. 3, in an example relating to a device for chopping an input voltage $V_g$ having the structure of a DC-DC voltage converter, of the step-down voltage (or "Buck" structure) type. It goes without saying, however, that other embodiments may relate to a DC-DC voltage converter structure of the step-up voltage (or "Boost" structure) type, or of the step-down/step-up voltage (or structure known as "Buck-Boost") type. Furthermore, the teaching of the invention may be applied to other types of switched electronic devices, in applications such as digital-analog conversion, amplification (e.g. in class D amplifiers, for audio or other), and power electronic control (for example speed variators for electric motors, etc.).

The power transistor Q1 in the device for chopping the input voltage can, for example, be of the MOSFET or IGBT type.

In place of the control unit 10 in FIG. 1, the control unit 30 for the device shown in FIG. 3 comprises two hysteresis comparators 31 and 32. The functioning will be described with reference, as needed, to the timing diagrams in FIGS. 5a to 5e which are to be compared with those in FIGS. 2a to 2e and which respectively show the same signals. FIG. 5a shows a current $I_R$ which is linearly increasing in a first period of time, and is linearly decreasing in the second period of time.

The first hysteresis comparator 31 has a first low-voltage threshold Vmin and a first high-voltage threshold Vmax higher than Vmin. It is designed, when it is enabled, to generate the control signal CTRL depending on the result of the comparison between the output voltage Vout, on the one hand, and Vmin and Vmax on the other.

The second hysteresis comparator 32 has a low-voltage threshold Vmin2, and a high-voltage threshold Vmax2, higher than Vmin2. It is designed, when it is enabled, to generate the control signal CTRL depending on the result of the comparison between the output voltage Vout, on the one hand, and Vmin2 and Vmax2 on the other. The difference ΔV2 between the high-voltage threshold Vmax2 and the low-voltage threshold Vmin2 of the second comparator 32 is lower than the difference ΔV between the high-voltage threshold Vmax and the low-voltage threshold Vmin of the first comparator 31.

In other words, and as illustrated on the graph in FIG. 5b which will be considered hereinbelow, the ripple on the output voltage Vout is in principle included in the interval [Vmin–Vmax] (which is marked ΔV in FIG. 3b) when the comparator 31 is enabled, and within the interval [Vmin2–Vmax2] (which is marketed ΔV2 in FIG. 3b), when the comparator 32 is enabled. ΔV2 is small compared to ΔV such that the frequency of the control signal can undergo a significant jump when going from the use of the comparator 31 to the use of the comparator 32. On average, the voltage Vout has a level substantially equal irrespective of the comparator, 31 or 32, that is enabled. In the example shown, the low-voltage threshold Vmin2 is higher than the low-voltage threshold Vmin, and the high-voltage threshold Vmax2 is lower than the high-voltage threshold Vmax. This example is however non-limiting, since other configurations are possible with regard to the levels of the four threshold voltages, as long as the difference ΔV2 is substantially lower than the difference ΔV.

Once again in FIG. 3, the device also comprises a control unit 34 designed to measure the control signal CTRL frequency Fq, shown by the graph in FIG. 5e. It is also designed to enable either the first hysteresis comparator 31 or the second hysteresis comparator 32, depending on the frequency Fq measured. More particularly, the first hysteresis comparator 31 is enabled for control signal low frequencies, and the second hysteresis comparator is enabled for control signal high frequencies. The terms "low" and "high" are understood here to be for frequencies whose respective values are considered relative to one another. The definition of the values of frequency for which one or the other of the comparators 31 and 32 is enabled depends on the application.

With reference to FIG. 5e, and starting from a situation where the frequency Fq is low such that the hysteresis comparator 31 is enabled, the control unit 34 is designed to disable the first comparator 31 and to enable the second comparator 32 when the control signal CTRL frequency Fq becomes higher than a first frequency threshold Fq1. This occurs at the moment in time marked t1 in FIG. 5e.

Conversely, the second hysteresis comparator 32 being enabled, the control circuit 34 is designed to disable it and to enable the first comparator 31 when the frequency Fq of the control signal CTRL becomes lower than a second frequency threshold Fq2, higher than the first frequency threshold Fq1. This occurs at the moment in time marked t2 in FIG. 5e.

There preferably exists a hysteresis for the control of the enabling of the comparators 31 and 32, such that the frequency jump obtained when going from one comparator to the other greatly exceeds the forbidden frequency band, which allows the spurious and frequent switching from one to the other within the transition region of the spectrum of frequencies, between the low frequencies and the high frequencies, to be avoided.

In one example, the first frequency threshold Fq1 is around 150 kHz, and/or the second frequency threshold Fq2 is around 300 kHz.

The advantage obtained by the device thus described is that the operation with a switching frequency (control signal CTRL frequency) included within the band [Fq1–Fq2] is avoided. It is then just necessary to configure the control unit in order that the thresholds Fq1 and Fq2 correspond to the low and high limits, respectively, of the forbidden band which it is desired to avoid.

Thus configured, the control unit 34 ensures the enabling of the comparator 31 whose hysteresis interval ΔV is relatively high for the low values of the current $I_R$. If $I_R$ increases toward the high values until it reaches a first value via lower values, like at the time t1 in FIG. 2e, the unit 34 causes the comparator 31 to be disabled and the comparator 32 whose hysteresis interval ΔV2 is relatively lower to be enabled. This makes the frequency Fq rise abruptly. If the current $I_R$ then decreases toward the low values until it reaches a second value (higher than the first value hereinabove) via higher values, the unit 34 causes the comparator 32 to be disabled and the comparator 31 whose hysteresis ΔV is relatively higher to be enabled. This makes the frequency Fq fall abruptly.

The graph in FIG. 6 shows the variation of the signal CTRL frequency Fq variation when the load current $I_R$ is linearly increasing, here in the range included between 0 and 1 Ampere. This details the frequency jump which takes place at the time t1 in FIG. 5e, when the current $I_R$ reaches the first value mentioned in the preceding paragraph. As can be seen, the frequencies included in the band [Fq1–Fq2] are avoided.

The selective use of the comparator 31 or of the comparator 32 results from the measurement of the control signal frequency. Depending on its value, one or the other of these comparators is enabled by the unit 34. The method of measurement of the frequency is not limiting, and can give rise to more than one embodiment of the device. In this respect, only one example of means of measurement of the frequency is provided hereinafter.

With reference to FIG. 4, the control unit 34 can comprise a pulse counter. Such a counter 41 is designed to deliver at its output a number of pulses of the control signal counted per unit of time, corresponding to a measurement of the control signal CTRL frequency. More particularly, this number of pulses is proportional to the period 1/Fq of the control signal CTRL.

The counter 41 comprises for example an enable input 42 receiving an enable signal En, and a clock input 43 receiving a clock signal CLK with a frequency substantially higher than the range of frequencies of the control signal CLK, for example of the order of a few megahertz to a few tens of megahertz. It also comprises an input for resetting to zero 44, receiving the signal CTRL whose frequency is being measured, via an edge detector 45, for example a rising edge detector. As will have been understood, the counter counts the number of clock pulses CLK between two rising edges of the signal CTRL, as long as the signal En is enabled. This number, delivered at the output, is a measurement of the frequency Fq since it is representative of the period 1/Fq of the signal CTRL.

The counter 41 and the edge detector 45 may take the form of an FPGA circuit (for "Field Programmable Gate Array"). All or a part of the control unit may also take the form of software.

For example, a switched-mode power supply such as described hereinabove may be used for supplying power to an automobile vehicle electronic control unit. In this case, the device for chopping the input voltage preferably has the structure of a DC-DC voltage converter of the step-down voltage converter type. The input voltage $V_g$ is typically the battery voltage, in the range between 12 and 14 volts or between 24 and 28 volts, and the output voltage Vout is a fixed voltage of around 1.5 to 2.4 volts depending on the technology of the processor, for example 1.8 volts.

Another aspect of the invention relates to a switching method for a circuit designed to generate an output voltage starting from a control signal with two pulse-width modulated states.

The method comprises the measurement of the control signal frequency, and the enabling of the hysteresis comparator 31 or of the hysteresis comparator 32 depending on the control signal measured frequency, in order to generate the control signal.

The present invention has been described and illustrated in the present detailed description and in the figures. The present invention is not limited to the embodiments presented. Other variants and embodiments may be deduced and implemented by those skilled in the art upon reading the present description and the appended figures.

In particular, the principle of the invention may be extended to the exclusion of more than one forbidden band of frequencies, by increasing the number of hysteresis comparators, which is not limited to two.

In the claims, the term "comprising" does not exclude other elements or other steps. The indefinite article "a" does not exclude the plural. A single processor or several other units may be used to implement the invention. The various features presented and/or claims may advantageously be combined. Their presence in the description or in different dependent claims does not exclude this possibility. The reference signs should not be understood as limiting the scope of the invention.

The invention claimed is:

1. An electronic device comprising:
    a switched circuit having an output designed to deliver an output voltage, and controlled by a control signal with two pulse-width modulated states;
    a first hysteresis comparator, with a first low-voltage threshold and a first high-voltage threshold higher than said first low-voltage threshold, designed to generate the control signal depending on a comparison between the output voltage and the first low-voltage threshold and the first high-voltage threshold;
    at least a second hysteresis comparator, with a second low-voltage threshold and a second high-voltage threshold higher than said second low-voltage threshold, designed to generate the control signal depending on a comparison between the output voltage and the second low-voltage threshold and the second high-voltage threshold, a difference between the second high-voltage threshold and the second low-voltage threshold being less than a difference between the first high-voltage threshold and the first low-voltage threshold; and
    a control unit (34) adapted to measure a control signal frequency, and for enabling either the first hysteresis comparator or the second hysteresis comparator depending on the control signal measured frequency, the first hysteresis comparator being enabled for relatively control signal low frequencies, and the second hysteresis comparator being enabled for relatively control signal high frequencies.

2. The electronic device as claimed in claim 1, in which, the first hysteresis comparator being enabled, the control unit is adapted to disable the first hysteresis comparator and for enabling the second hysteresis comparator when the control signal frequency becomes higher than a first frequency threshold.

3. The electronic device as claimed in claim 1, in which, the second hysteresis comparator being enabled, the control unit is adapted to disable the second hysteresis comparator and to enable the first hysteresis comparator when the control signal frequency becomes lower than a second frequency threshold, higher than the first frequency threshold.

4. The electronic device as claimed in claim 1, in which the second low-voltage threshold is higher than the first low-voltage threshold, and the second high-voltage threshold is lower than the first high-voltage threshold.

5. The electronic device as claimed in claim 1, in which the control unit comprises a pulse counter, designed to deliver a number of pulses of the control signal counted per unit of time as a measurement of the frequency of said control signal.

6. A switched-mode power supply comprising at least one device for chopping an input voltage, wherein the chopping device comprises an electronic device as claimed in claim 1 whose output voltage corresponds to a supply voltage delivered by the switched-mode power supply.

7. The switched-mode power supply as claimed in claim 6, in which the device for chopping the input voltage has the structure of a DC-DC voltage converter, of the step-down voltage converter, the step-up voltage converter, or the step-down/step-up voltage converter type.

8. The switched-mode power supply as claimed in claim 6, in which the device for chopping the input voltage comprises a MOSFET or IGBT power transistor.

9. The switched-mode power supply as claimed in claim 7, in which the device for chopping the input voltage comprises a MOSFET or IGBT power transistor.

10. A switching method for a circuit designed to generate an output voltage starting from a control signal with two pulse-width modulated states, comprising:
   measuring control signal frequency; and,
   enabling a first hysteresis comparator or a second hysteresis comparator depending on the measured control signal frequency, in order to generate the control signal,
in which:
   the first hysteresis comparator having a first low-voltage threshold and a first high-voltage threshold higher than said first low-voltage threshold, and being adapted to generate the control signal depending on a the comparison between the output voltage, the first low-voltage threshold and the first high-voltage threshold, is enabled for relatively low frequencies of the control signal; and,
   the second hysteresis comparator having a second low-voltage threshold and a second high-voltage threshold higher than said second low-voltage threshold, and being adapted to generate the control signal depending on comparison between the output voltage, the second low-voltage threshold and the second high-voltage threshold, is enabled for relatively high frequencies of the control signal, and in which:
   a difference between the second high-voltage threshold and the second low-voltage threshold is lower than a difference between the first high-voltage threshold and the first low-voltage threshold.

11. The electronic device as claimed in claim 2, in which, the second hysteresis comparator being enabled, the control unit is adapted to disable the second hysteresis comparator and to enable the first hysteresis comparator when the control signal frequency becomes lower than a second frequency threshold, higher than the first frequency threshold.

12. The electronic device as claimed in claim 2, in which the second low-voltage threshold is higher than the first low-voltage threshold, and the second high-voltage threshold is lower than the first high-voltage threshold.

13. The electronic device as claimed in claim 3, in which the second low-voltage threshold is higher than the first low-voltage threshold, and the second high-voltage threshold is lower than the first high-voltage threshold.

14. The electronic device as claimed in claim 2, in which the control unit comprises a pulse counter, designed to deliver a number of pulses of the control signal counted per unit of time as a measurement of the frequency of said control signal.

15. The electronic device as claimed in claim 3, in which the control unit comprises a pulse counter, designed to deliver a number of pulses of the control signal counted per unit of time as a measurement of the frequency of said control signal.

16. The electronic device as claimed in claim 4, in which the control unit comprises a pulse counter, designed to deliver a number of pulses of the control signal counted per unit of time as a measurement of the frequency of said control signal.

17. A switched-mode power supply comprising at least one device for chopping an input voltage, wherein the chopping device comprises an electronic device as claimed in claim 2, whose output voltage corresponds to a supply voltage delivered by the switched-mode power supply.

18. A switched-mode power supply comprising at least one device for chopping an input voltage, wherein the chopping device comprises an electronic device as claimed in claim 3, whose output voltage corresponds to a supply voltage delivered by the switched-mode power supply.

19. A switched-mode power supply comprising at least one device for chopping an input voltage, wherein the chopping device comprises an electronic device as claimed in claim 4, whose output voltage corresponds to a supply voltage delivered by the switched-mode power supply.

20. A switched-mode power supply comprising at least one device for chopping an input voltage, wherein the chopping device comprises an electronic device as claimed in claim 5, whose output voltage corresponds to a supply voltage delivered by the switched-mode power supply.

* * * * *